US010596885B1

(12) United States Patent
McWilliams et al.

(10) Patent No.: US 10,596,885 B1
(45) Date of Patent: Mar. 24, 2020

(54) FLEXIBLE TARPAULIN SUPPORT DEVICE

(71) Applicants: Clifford O. McWilliams, Owasso, OK (US); Shea O'Neal Williams, Marion, AR (US); Jacob Foster Bailey, Olney, TX (US)

(72) Inventors: Clifford O. McWilliams, Owasso, OK (US); Shea O'Neal Williams, Marion, AR (US); Jacob Foster Bailey, Olney, TX (US)

( * ) Notice: Subject to any disclaimer, the term of this patent is extended or adjusted under 35 U.S.C. 154(b) by 0 days.

(21) Appl. No.: 16/153,213

(22) Filed: Oct. 5, 2018

(51) Int. Cl.
*B60J 7/10* (2006.01)

(52) U.S. Cl.
CPC .................. *B60J 7/102* (2013.01)

(58) Field of Classification Search
CPC ... B60J 7/102; B60J 7/062; B60J 7/065; B60J 7/067; B60J 7/085; B60J 7/123; B60J 7/1234; B60J 7/1243
USPC ... 296/100.12, 104, 105, 100.13, 43, 40, 36, 296/26.09; 135/140, 906, 904, 119, 137, 135/144
See application file for complete search history.

(56) References Cited

U.S. PATENT DOCUMENTS

| 2,322,424 A | 6/1943 | Deisley |
| 2,565,746 A | 8/1951 | Turner |
| 2,683,265 A | 7/1954 | Wayne |
| 2,955,874 A | 10/1960 | Brindley |
| 3,226,153 A | 12/1965 | Haid |
| 3,837,702 A * | 9/1974 | Case ........................ B60J 7/102 296/36 |
| 3,894,766 A | 7/1975 | Woodward |
| 4,035,015 A * | 7/1977 | Smith ................... B62D 33/023 296/183.1 |
| 4,248,475 A | 2/1981 | Johnsen |
| 5,100,549 A | 3/1992 | Langerak et al. |
| 5,102,182 A | 4/1992 | Haddad, Jr. |
| 5,288,123 A | 2/1994 | Dimmer |
| 5,429,408 A | 7/1995 | Henning et al. |
| 5,664,824 A | 9/1997 | Stephens et al. |
| 5,873,210 A | 2/1999 | Brumleve |

(Continued)

FOREIGN PATENT DOCUMENTS

DE    3812506    3/1988

OTHER PUBLICATIONS

El Cheapo Tarp Bows, Feather Craft Forum; http://729.activeboard.com/t37303339/el-cheapo-tarp-bows/, Apr. 2014.

(Continued)

*Primary Examiner* — D Glenn Dayoan
*Assistant Examiner* — Sunsurraye Westbrook
(74) *Attorney, Agent, or Firm* — Head, Johnson, Kachigian & Wilkinson, PC

(57) ABSTRACT

A tarpaulin support device for an open top of a trailer or vehicle. The device has a flexible and resilient tube assembly bowed from a normally straight position under tension to an arched position outwardly from the trailer or vehicle. The tube assembly may be removably mounted to the side walls of the trailer or vehicle via brackets with angled bores therethrough. The tube assembly comprises an outer tube and an inner tube located substantially within an outer tube. The inner tube may have a slot running along at least part of its length, such that the portion of the inner tube with the slot has a C-shaped cross-section.

10 Claims, 4 Drawing Sheets

(56) References Cited

U.S. PATENT DOCUMENTS

| | | | |
|---|---|---|---|
| D413,560 S | 9/1999 | Sambell | |
| 6,139,085 A | 10/2000 | Templin et al. | |
| 6,481,779 B1 | 11/2002 | Gothier et al. | |
| 7,472,666 B1 | 1/2009 | Richard et al. | |
| 7,661,750 B2 | 2/2010 | Liedmeyer et al. | |
| 8,303,017 B2 | 11/2012 | LeBlanc et al. | |
| D679,771 S | 4/2013 | Muggleton | |
| 8,454,076 B2 * | 6/2013 | Bourcier | B60J 7/102 296/100.18 |
| 8,579,353 B1 | 11/2013 | Aulick | |
| D761,713 S | 7/2016 | Hensley | |
| D768,555 S * | 10/2016 | McWilliams | D12/401 |
| 9,469,353 B1 | 10/2016 | McWilliams | |
| 9,522,705 B1 | 12/2016 | McWilliams | |
| 9,701,349 B1 | 7/2017 | McWilliams | |
| 2007/0035153 A1 | 2/2007 | Henning | |
| 2008/0012378 A1 | 1/2008 | LeBlanc et al. | |
| 2008/0290686 A1 | 11/2008 | Royer | |
| 2009/0121514 A1 | 5/2009 | Remmel et al. | |
| 2011/0254310 A1 | 10/2011 | Royer | |
| 2012/0085380 A1 | 4/2012 | Buckley | |

OTHER PUBLICATIONS

Covering the Tanzer 22 for the Winter using PVC Conduit and a tarp; http://www.christinedemerchant.com/tanzer_winter-cover.html; Apr. 2014.

Tarp Support Bows, Bantam Trailer Blog; http://boyink.com/bantam/tarp-support-bows/; Boyink, Apr. 2014.

\* cited by examiner

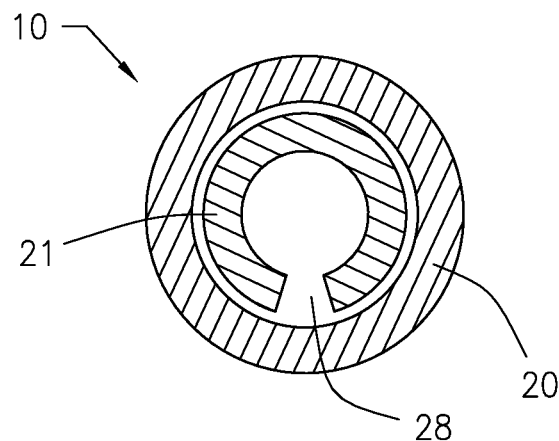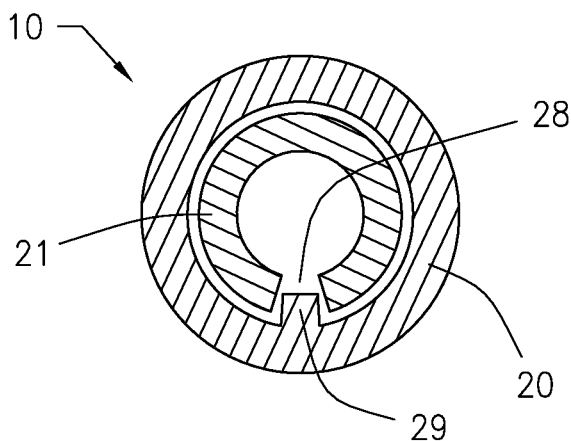
FIG. 5A  FIG. 5B
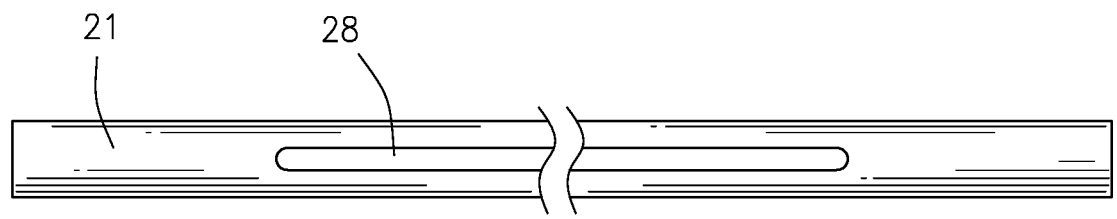
FIG. 6
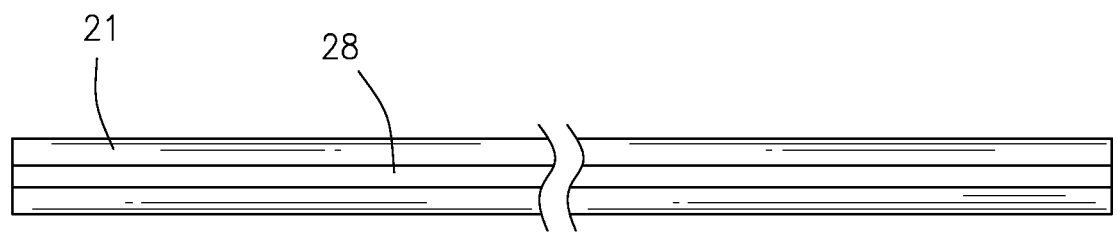
FIG. 7

FLEXIBLE TARPAULIN SUPPORT DEVICE

BACKGROUND OF THE INVENTION

Cross Reference

Not Applicable.

FIELD OF THE INVENTION

This invention relates generally to a tarpaulin support device for semi-trailers, and more particularly, but not by way of limitation, to a tarp bow that is flexible and has more than one layer.

DESCRIPTION OF THE RELATED ART

As noted in Stephens et al., U.S. Pat. No. 5,664,824, incorporated by reference herein, tractor trailers used to haul loose material, such as sand and gravel, will often employ a tarpaulin cover over the open top of the trailer having a bottom and a pair of opposed side walls. The tarpaulin discourages any of the loose material from falling or being blown off during transportation. A series of curved bows extending laterally across the open top form a support for the tarpaulin. Use of a tarpaulin which is arched at the center provides a number of advantages. Rainwater will run off of the load more easily. Additionally, the arched center accommodates high loads. In the case of sand and gravel, loading of these materials is often preceded by removal of the bows in order to avoid damage. Loading of these materials through the open top will often dent, twit, and break the support bows.

Stephens et al. solves this problem by making the bow flexible. Specifically, Stephens et al. teaches a tarpaulin support device for an open top of a trailer, vehicle, or the like, where the device includes a flexible and resilient pole made of nylon composite which, although sturdy, is both flexible and resilient. The pole is normally straight but, when installed, bows outwardly away from the floor of the trailer. The pole will flex and deflect if sand, gravel, or other materials impact the pole during loading operations or in the event of impact from an end loader or other loading equipment used during the loading operation. Thus, the pole may be kept in place during loading of the trailer.

The pole of Stephens et al. is mounted to the trailer via opposing brackets, where each bracket is attached to the trailer and each has a non-cylindrical opening therein. A first socket and a second socket each have a receptacle to receive one of the pole ends, each socket terminating in a non-cylindrical post receivable in one of the openings to retain the sockets and retain the pole and to prevent radial movement of the pole.

Despite its many advantages, there are certain drawbacks to the Stephens et al. device. Notably, the nylon of the pole tends to become rough through use, causing the tarpaulin to wear and eventually tear. Additionally, the nylon tends to crack in both cold and heat. The nylon pole can be costly to replace, particularly considering the fact that a single trailer requires multiple poles. Another drawback of the Stephens et al. device is that, over time, it tends to cause the walls of the trailer to deflect outward.

These issues are addressed in McWilliams, U.S. Pat. Nos. 9,469,353, 9,522,705, 9,701,349, and D768,555, all of which are incorporated by reference herein, which teach a flexible tube assembly comprising an outer tube and either an inner tube, a rod, or an inner tube and a rod, where the inner tube and/or rod are located within and are substantially concentric with the outer tube. The McWilliams patents also teach a bracket for retaining the flexible tube assembly in place on a trailer or vehicle. In the McWilliams patents, the outer tube is made of PVC; the inner tube, if present, is made of PVC; and the rod, if present, is made of nylon composite.

Under normal conditions, the tarpaulin support device of the McWilliams patents provides all of the advantages of the Stephens et al. device, but avoids all of the drawbacks stated above. Under certain heavy rain conditions, however, the bows of the McWilliams patents have proved to be too flexible, occasionally buckling under the weight of the heavy rain on the tarp.

Based on the foregoing, it is desirable to provide a flexible bow that provides the advantages of the device of the McWilliams patent but with slightly more rigidity, while still retaining the advantages of the Stephens et al. without the drawbacks stated above.

SUMMARY OF THE INVENTION

In general, in a first aspect, the invention relates to a tarpaulin support device for an open top of a trailer or vehicle, the device comprising a flexible and resilient tube assembly having a first end and a second end, where the tube assembly comprises an outer tube and an inner tube located substantially within the outer tube. The outer tube may be at least as long as the inner tube. The outer tube and the inner tube may be substantially concentric. The inner tube may have a slot such that at least part of the inner tube has a C-shaped cross-section.

The inner tube may have a length and the slot may extend the entire length of the inner tube. Alternately, the inner tube may have a first end, a middle section, and a second end and the slot may extend along the middle section only, leaving the first end and the second end with a circular cross-section. The inner tube may be made of aluminum, while the outer tube may be made of PVC. The outer tube may be freeze resistant, UV resistant, or both freeze resistant and UV resistant.

The tarpaulin support device may further comprise a rod located substantially within the inner tube, where the outer tube is at least as long as the rod and the outer tube, the inner tube, and the rod are substantially concentric. The rod may be made of nylon composite or other non-metallic material.

The tarpaulin support device may further comprise a first bracket and a second opposed bracket, each bracket attached to the trailer or vehicle and having a bore extending at least partially therethrough to receive either the first end or the second end of the tube assembly to retain the tube assembly in an arched position. Each bore may extend at an upward angle from the trailer or vehicle, thus facilitating the arched position of the tube assembly outwardly from the trailer or vehicle.

BRIEF DESCRIPTION OF THE DRAWINGS

FIG. 5a is a sectional view taken along section line 5-5;

FIG. 5b is a sectional view of an alternate embodiment taken along section line 5-5;

FIG. 6 is a bottom view of the flexible tarpaulin support device in an unbowed position; and FIG. 7 is a bottom view of an alternate embodiment of the flexible tarpaulin support device in an unbowed position.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
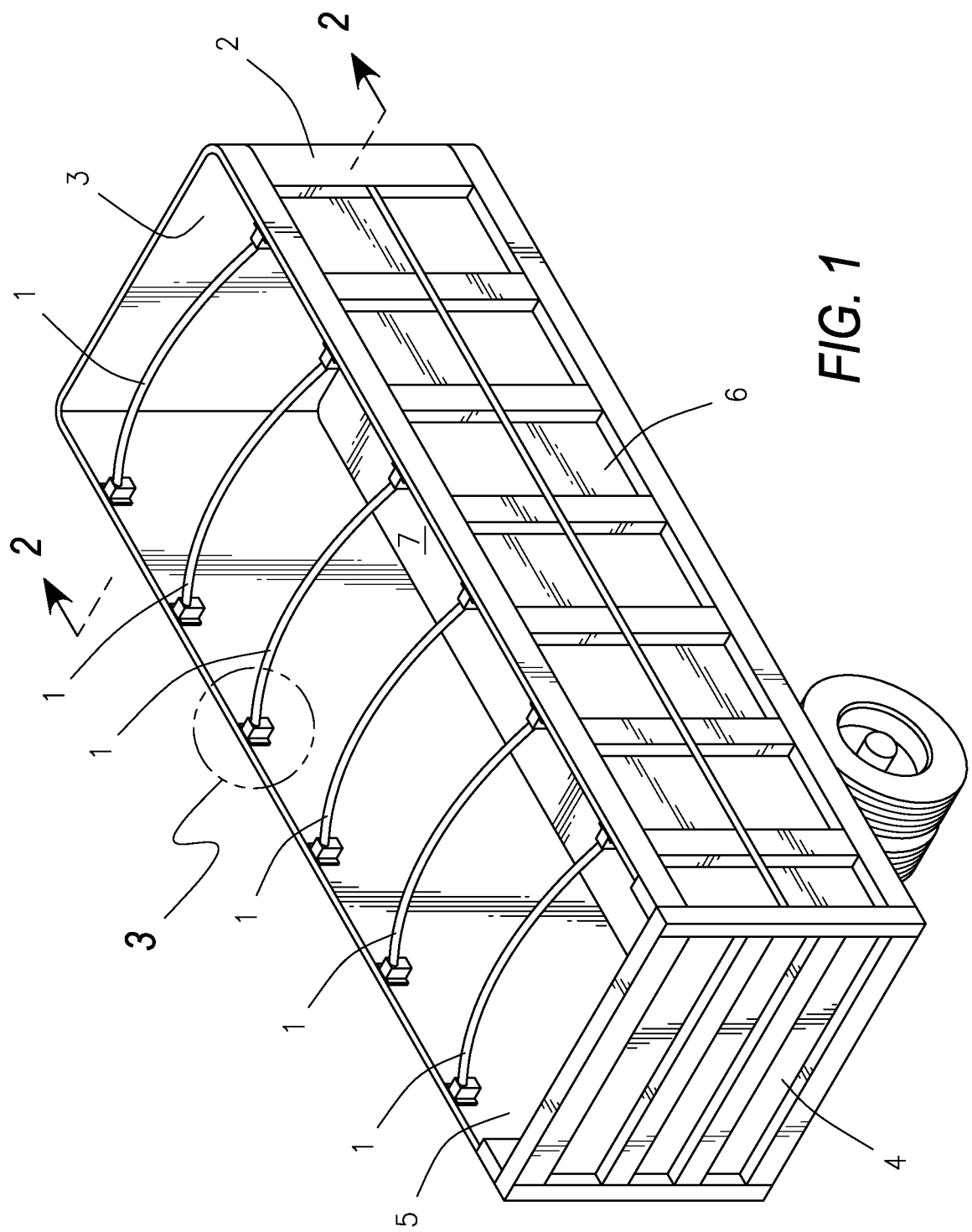
FIG. 1 is a perspective view of a semi-trailer with multiple flexible tarpaulin support devices installed thereon.

In general, in a first aspect, the invention relates to a tarpaulin support device 1, as shown in the Figures. As seen in FIG. 1, one or more of the tarpaulin support devices 1 may be used on a semi-trailer 2 or other vehicle. The trailer 2 may include a front end wall 3; an opposed rear end 4 which may include a removable or swinging gate that may be closed during loading and transportation and open for unloading; a pair of opposed side walls 5 and 6; and a floor 7. The trailer 2 may have an open top, which may be covered by a tarpaulin after the trailer 2 has been loaded with sand, gravel, or other material to discourage any of the loose material from falling or being blown off during transportation.

Figure 2:
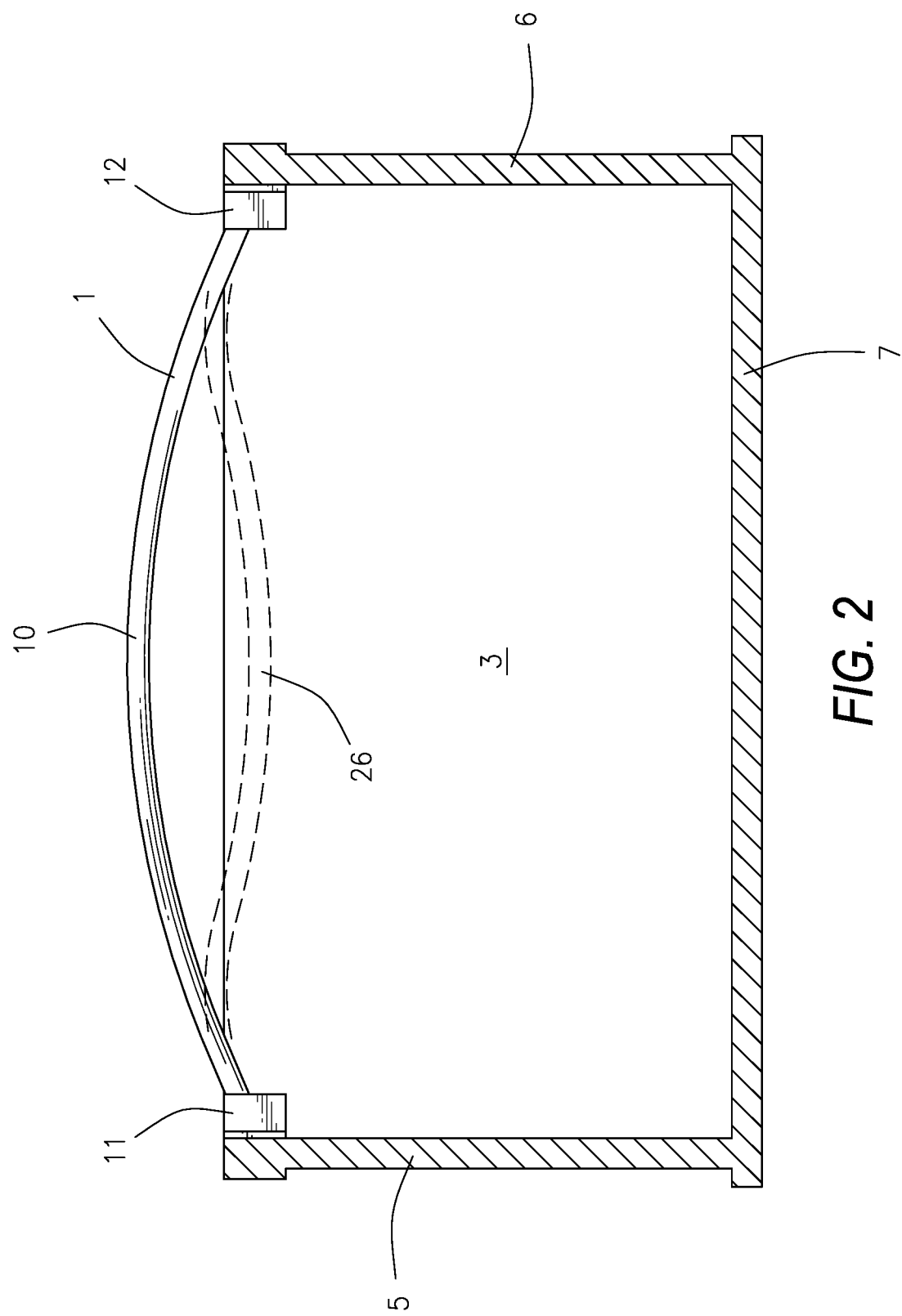
FIG. 2 is a sectional view taken along section line 2-2.

Each tarpaulin support device 1 may comprise a tube assembly 10 extending laterally across the open top, as seen in FIGS. 1 and 2. The tube assembly 10 may have a circular cross section, or any other desired cross section, with a hollow center. The tube assembly 10 may be normally straight, as shown in FIGS. 6 and 7. When installed, the tube assembly 10 may be bowed outwardly away from the floor 7 of the trailer 2, as shown in FIG. 1. By exerting force, the tube assembly 10 may be moved from its normally straight condition to the arched position for use; when the force is released, the tube assembly 10 may return to its straight condition.

Figure 3:
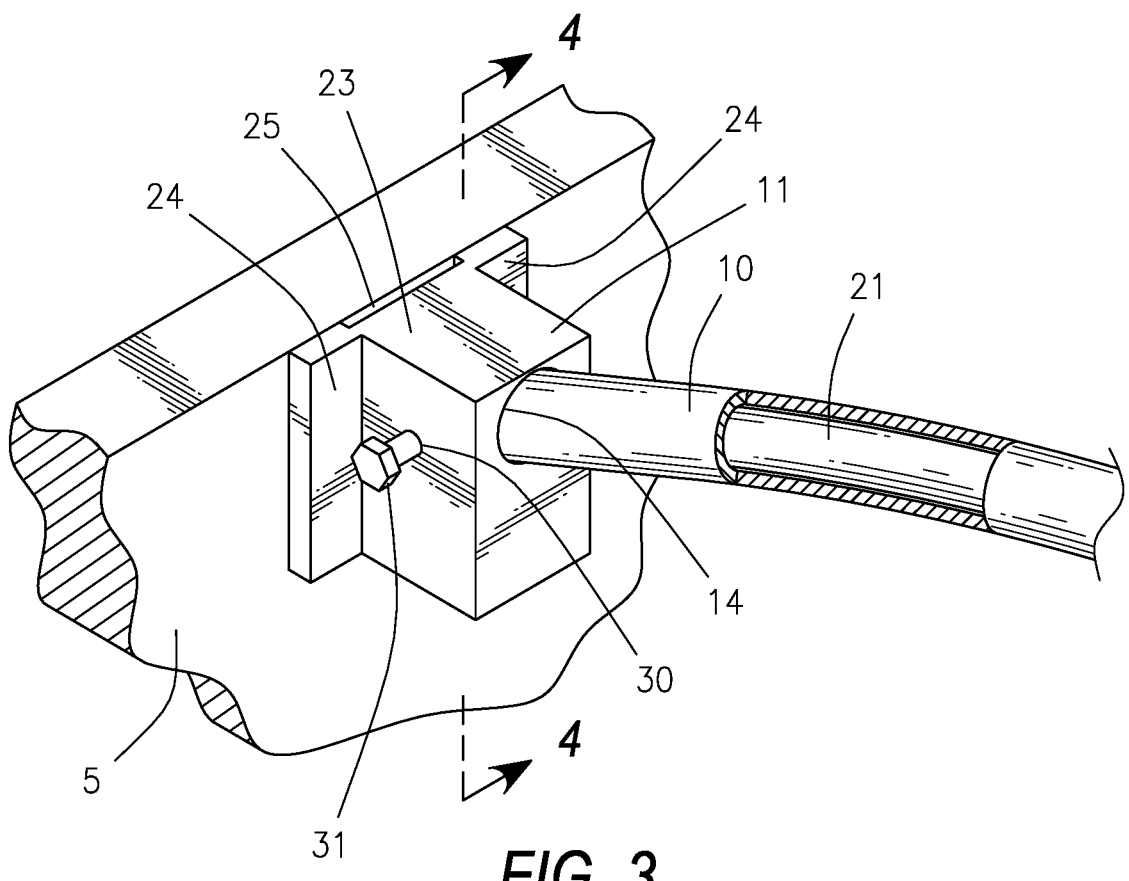
FIG. 3 is a partial, cutaway view of the flexible tarpaulin support device.
Figure 4:
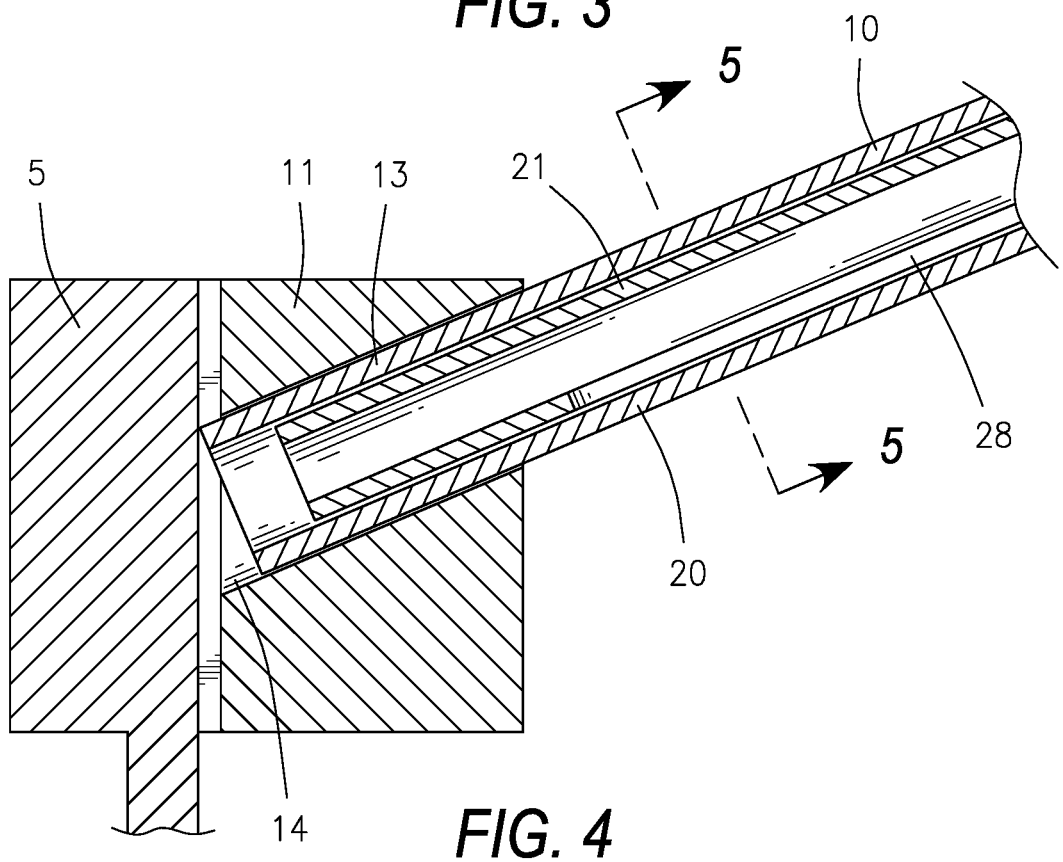
FIG. 4 is a sectional view taken along section line 4-4.

As seen in FIGS. 3 and 4, the tarpaulin support device 1 may further comprise a first bracket 11 and a second bracket 12, where the tube assembly 10 has two opposing ends 13 and where one of the ends 13 is receivable in the first bracket 11 and the other end 13 is receivable in the second bracket 12. Specifically, each bracket 11 and 12 may have a cylindrical bore 14 therethrough to receive the ends 13 of the tube assembly 10. It will be understood that other non-cylindrical configurations of the tube assembly 10 and bore 14 might be employed with the same results.

The tube assembly 10 may not be permanently affixed in the brackets 11 and 12. To insert, ends 13 the tube assembly 10 may be moved axially into the bores 14 of the brackets 11 and 12.

Each of the first brackets 11 may be attached to the side wall 5 of the trailer 2, while each of the second brackets 12 may be attached to the side wall 6 of the trailer 2. The brackets 11 and 12 may be welded or otherwise secured to the side walls 5 and 6. Each of the brackets 11 and 12 may be arranged so that its bore 14 angles downward toward the side wall 5 or 6 to which the bracket 11 or 12 is attached, as seen in FIG. 4, facilitating the upward arch of the tube assembly 10. When multiple tarpaulin support devices 1 are used on a trailer 2, the bores 14 of each of the first brackets 11 may be parallel to each other, while the bores 14 of each of the second brackets 12 may be parallel to each other.

The tube assembly 10 may comprise one or more substantially concentric tubes, which may or may not surround a rod. For example, the tube assembly 10 may comprise an outer tube 20 surrounding an inner tube 21, as seen in FIG. 4. Alternately, the tube assembly 10 may comprise an outer tube 20 surrounding an inner tube 21, which in turn surrounds a rod, or an outer tube 20 surrounding a rod. Any number of tubes, with or without a rod, may be included in the tube assembly and remain within the scope of the invention. The inner tube 21, if present, may have a smaller outer diameter than the inner diameter of the outer tube 20. Likewise, the rod, if present, may have a smaller diameter than the inner diameter of the outer tube 20. If both the rod and the inner tube 21 are present, the rod may have a smaller diameter than the inner diameter of the inner tube 21.

The inner tube 21 may have a slot 28, as shown in FIGS. 5, 6, and 7. The slot 28 may run axially along one side of the inner tube 21, extending fully from the exterior of the inner tube 21 to the interior of the inner tube 21. The slot 28 may not extend to the ends of the inner tube 21, as shown in FIG. 6, leaving both ends of the inner tube 21 intact as tubes. The intact tubular ends may prevent the inner tube 21 from rotating during use and may allow the ends of the inner tube 21 to slide within the outer tube 20 as the tube assembly 10 is flexed. Alternately, the slot 28 may run the entire length of the inner tube 21, as shown in FIG. 7. The slot 28 may cause the inner tube 21 to have a C-shaped cross section along the length of the slot 28, as shown in FIGS. 5a and 5b. When in use, the slot 28 may be at the bottom of the inner tube 21, pointing downward, also as shown in FIGS. 5a and 5b. Alternately, the inner tube 21 may be rotated as desired to change the direction in which the tube assembly 10 flexes during use.

The outer tube 20 may have a cylindrically interior bore such that the cross-section has a ring shape, as shown in FIG. 5a. Optionally, the outer tube 20 may have a projection 29 protruding from its interior surface, as shown in FIG. 5b. The projection 29 may run along the full length of the outer tube 20 or may run along only a portion of the outer tube 20, as desired. The projection 29 may be sized appropriately to extend into the slot 28 of the inner tube 21 during use, thus preventing the inner tube 21 from rotating relative to the outer tube 20. The outer tube 20 may be extruded with the projection 29 in place; alternately, the projection 29 may be attached to the outer tube 20.

The inner tube 21 may be made of aluminum, which may be extruded. If a tube of aluminum without a slot were to be used in the present invention, the aluminum would prove too rigid to properly bow. The slot 28 may allow the inner tube 21 to bow sufficiently to fit between the brackets 11 and 12. The slot 28 may also allow the inner tube 21 to flex during use, while the use of aluminum may provide more rigidity, even with the slot 28, than a tube made of PVC. The desired amount of flex may be achieved by altering the width of the slot 28. For example, the slot 28 may be ⅛ inch wide. A smaller gap would provide more rigidity, while a wider gap would provide more flex.

The length of the tube assembly 10 may be longer than the distance between the first bracket 11 and the second bracket 12 as installed or, alternately stated, longer than the distance between side wall 5 and side wall 6 at the location at which the brackets 11 and 12 are or will be installed. Accordingly, the tube assembly 10 may be under tension when bowed. If an inner tube 21 or a rod is included in the tube assembly 10, it may optionally be shorter than the outer tube 20. This is because the arch of the inner tube 21 and/or rod may be different than that of the outer tube 20 due to their concentric nature, which causes the inner tube 21 and/or rod to protrude from the ends of the outer tube 20 when arched if they are the same length.

The shorter inner tube 21 may be of particular utility when the inner tube 21 is aluminum and C-shaped and the outer tube 20 is made of non-metallic material. During use, the non-metallic components may compress before the inner tube 21 comes into contact with the trailer wall 5 or 6, thus stopping the tube assembly 10 from continuing to flex downward toward the floor 7 of the trailer 2. The angle at which the tube assembly 10 flexes may be controlled by the rotation of the slot 28 within the tube assembly 10. For example, when the slot 28 points downward, the tube assembly 10 may flex downward easier; when the slot 28 points sideways, the tube assembly 10 may tend to flex to the side more easily, potentially twisting the inner tube 21.

The inner tube 21 and/or rod may be completely or substantially completely interior to the outer tube 21, such that the inner tube 21 and/or rod is completely or substantially completely covered by the outer tube 21. Alternately to the shorter inner tube 21 and/or rod, the inner tube 21 and/or rod may substantially the same length as the outer tube 21, such that the tube assembly 10 may have multiple layers at all points along its length. The outer tube 20, inner tube 21 if present, rod if present, and any additional tubes if present may all be concentric when in their straight condition.

The outer tube 20 may be made of PVC pipe which, although sturdy, is both flexible and resilient. In particular, the tubes may be made of Schedule 80 PVC, which is freeze-resistant. Alternately, the outer tube 20 may be made of any non-metallic material. The outer tube 20 may be made of UV-resistant material or, additionally or alternately, may be coated in a UV-resistant coating. The rod, if it is present, may be made of nylon or other non-metallic material. The rod may likewise be sturdy, flexible, and resilient.

As noted above, the inner tube 21 may be made of aluminum. Alternately, the inner tube 21, as well as any additional tubes, if they are present, may be made of PCV pipe or any desired metallic or nonmetallic materials.

Brackets 11 and 12 may comprise a body 23 with the bore 14 extending therethrough and one or more legs 24 extending from the body 23. The bore 14 may fully extend through the body 23 such that water may drain through the bore 14 rather than collecting in the body 23. If water were to collect within the body 23, it may freeze, expand, and break the body 23. Allowing water to drain through the bore 14 may prevent such damage. The bore 14 may also prevent the collection of dust within the body 23, where it may otherwise seize the tube assembly 10 or break the body 23.

The body 23 may attach to side wall 5 or 6 via the legs 24. The legs 24 may be spaced such that a gap 25 is formed between the side wall 5 or 6 and at least a portion of the body 23, as shown in FIG. 3. The gap 25 may be located adjacent the bore 14 such that the tube assembly 10 may extend through the bore 14 and terminate at least partially in the gap 25, as shown in FIG. 4. The legs 24 may be positioned on either side of the bore 14, with one leg 24 to the right of the bore 14 and another leg 24 to the left of bore 14, with the gap 25 running vertically, as shown in FIG. 3. Alternately, the legs 24 may be positioned above and below the bore 14, with the gap 25 running horizontally.

Brackets 11 and 12 may each have a hole 30 extending from one side to the bore 14. A bolt or pin 31 may extend through the hole 30 to secure the tube assembly 10, preventing the tube assembly 10 from rotating in the cylindrical bore 14. The bolt or pin 31 may be a bolt, a retainer pin, a drift pin, or any other suitable device for preventing rotation of the tube assembly 10 relative to the body 23 within the bore 14.

It has been found that the tarpaulin support device 1 and, in particular, the tube assembly 10 will flex and deflect if sand, gravel, or other materials impact the tube assembly 10 during the loading operation. The tube assembly 10 may also flex and deflect in the event of impact from an end loader or other loading equipment used during the loading operation. Such deflection is shown in dashed lines 26 on FIG. 2.

The outer tube 20 may protect the inner tube 21 and/or rod from damage, wear, UV exposure, color fading, etc., as well as insulating the inner tube 21 and/or rod from extreme temperatures. The nylon pole of Stephens et al. is prone to cracking when exposed to UV radiation and cannot withstand freezing temperatures. Thus, it must be removed when temperatures drop too low and must be replaced regularly. Furthermore, the nylon tends to get rough with use, causing wear in the tarp. In the present invention, the nylon rod may not need to be replaced as often due to the protection offered by the outer tube 20. When the outer tube 20 becomes worn or damaged, it may be replaced without replacing the inner tube 21 and/or rod. This may reduce the cost of use of the flexible support device over that of Stephens et al. The initial cost may likewise be lower due to the fact that less nylon may be used in the present invention. The brackets of the present invention may offer similar savings over Stephens et al. as they are simpler due to the fact that no socket is needed to prevent the tube assembly 10 from rotating, unlike the pole of Stephens et al. Finally, it has been found that the tarpaulin support device 1 does not cause the walls of the trailer 2 to deform in the way the Stephens et al. device does.

Whereas, the devices and methods have been described in relation to the drawings and claims, it should be understood that other and further modifications, apart from those shown or suggested herein, may be made within the spirit and scope of this invention.

What is claimed is:

1. A tarpaulin support device for an open top of a trailer or vehicle, the device comprising:
    a flexible and resilient tube assembly having a first end and a second end, where the tube assembly comprises:
        an outer tube; and
        an inner tube located substantially within the outer tube, where the outer tube is at least as long as the inner tube, where the outer tube and the inner tube are substantially concentric, and where the inner tube has a slot such that at least part of the inner tube has a C-shaped cross-section.

2. The tarpaulin support device of claim 1 where the inner tube has a length and where the slot extends the entire length of the inner tube.

3. The tarpaulin support device of claim 1 where the inner tube has a first end, a middle section, and a second end and where the slot extends along the middle section only, leaving the first end and the second end with a circular cross-section.

4. The tarpaulin support device of claim 1 where the inner tube is made of aluminum.

5. The tarpaulin support device of claim 1 where the outer tube is made of PVC.

6. The tarpaulin support device of claim 1 further comprising a rod located substantially within the inner tube, where the outer tube is at least as long as the rod and the outer tube, the inner tube, and the rod are substantially concentric.

7. The tarpaulin support device of claim 6 where the rod is made of nylon composite or other non-metallic material.

8. The tarpaulin support device of claim 1 further comprising a first bracket and a second opposed bracket, each bracket attached to the trailer or vehicle and having a bore extending at least partially therethrough to receive either the first end or the second end of the tube assembly to retain the tube assembly in an arched position.

9. The tarpaulin support device of claim 8 where each bore extends at an upward angle from the trailer or vehicle, thus facilitating the arched position of the tube assembly outwardly from the trailer or vehicle.

10. The tarpaulin support device of claim 1 where the outer tube is freeze resistant, UV resistant, or both freeze resistant and UV resistant.

\* \* \* \* \*